United States Patent
Walz et al.

(10) Patent No.: US 7,632,328 B2
(45) Date of Patent: Dec. 15, 2009

(54) FILTER APPARATUS FOR FILTERING THE AIR FOR AN INTERNAL COMBUSTION ENGINE

(75) Inventors: Stefan Walz, Ludwigsburg (DE); Pius Trautmann, Dingolfing (DE); Andreas Pelz, Markgroeningen (DE); Jobst Eisengraeber-Pabst, Benningen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 330 days.

(21) Appl. No.: 11/638,529

(22) Filed: Dec. 14, 2006

(65) Prior Publication Data

US 2007/0130896 A1 Jun. 14, 2007

(30) Foreign Application Priority Data

Dec. 14, 2005 (DE) .................. 20 2005 019 666 U

(51) Int. Cl.
*B01D 39/08* (2006.01)
*B01D 46/12* (2006.01)
*B01D 46/52* (2006.01)

(52) U.S. Cl. .................. 55/486; 55/385.3; 55/487; 55/488; 55/498; 55/502; 55/521; 55/524; 55/528

(58) Field of Classification Search ................ 55/385.3, 55/486, 487, 524, 502, 527, 528, 488, DIG. 20; 123/198 E
See application file for complete search history.

(56) References Cited

U.S. PATENT DOCUMENTS

| 2,019,241 | A | * | 10/1935 | Weiss ........................... 55/524 |
|---|---|---|---|---|
| 2,078,197 | A | * | 4/1937 | Hooker et al. ............... 55/385.1 |
| 3,290,870 | A | * | 12/1966 | Jensen .......................... 55/486 |
| 3,399,516 | A | | 9/1968 | Hough, Jr. et al. |
| 4,259,096 | A | * | 3/1981 | Nakamura et al. ............. 96/138 |
| 4,268,289 | A | * | 5/1981 | Polaner ......................... 55/486 |
| 4,758,460 | A | * | 7/1988 | Spicer et al. ................. 428/159 |
| 5,419,953 | A | * | 5/1995 | Chapman ...................... 442/35 |
| 5,704,953 | A | * | 1/1998 | Stemmer ...................... 55/483 |
| 5,800,586 | A | | 9/1998 | Cusick et al. |
| 5,814,219 | A | * | 9/1998 | Friedmann et al. ........ 210/493.3 |
| 5,858,044 | A | * | 1/1999 | Nepsund et al. ............... 55/486 |
| 5,922,096 | A | * | 7/1999 | Stemmer ...................... 55/483 |
| 6,293,983 | B1 | * | 9/2001 | More ........................... 55/486 |
| 6,336,948 | B1 | | 1/2002 | Inoue et al. |
| 6,540,805 | B2 | * | 4/2003 | Ohno et al. ................... 55/486 |
| 7,465,332 | B2 | * | 12/2008 | Randinelli .................... 55/524 |
| 2002/0129711 | A1 | | 9/2002 | Oda et al. |
| 2003/0150199 | A1 | | 8/2003 | Tanaka et al. |
| 2006/0174597 | A1 | * | 8/2006 | Greene .......................... 55/482 |

FOREIGN PATENT DOCUMENTS

| EP | 0 450 299 B1 | 10/1991 |
|---|---|---|
| EP | 0 917 901 B1 | 5/1999 |
| GB | 909893 | 11/1962 |

OTHER PUBLICATIONS

European Search Report dated Apr. 18, 2007 with English translation of relevant portion (Seven (7) pages).

* cited by examiner

*Primary Examiner*—Frank M Lawrence
*Assistant Examiner*—Robert A Clemente

(57) ABSTRACT

A filter device for filtering air in internal combustion engines equipped with a filter that can be inserted into a filter housing and has a flame-retardant effect. The filter comprises a main filter element and an upstream filter fleece whereby the flame-retardant effect is achieved by the fleece prefilter.

15 Claims, 1 Drawing Sheet

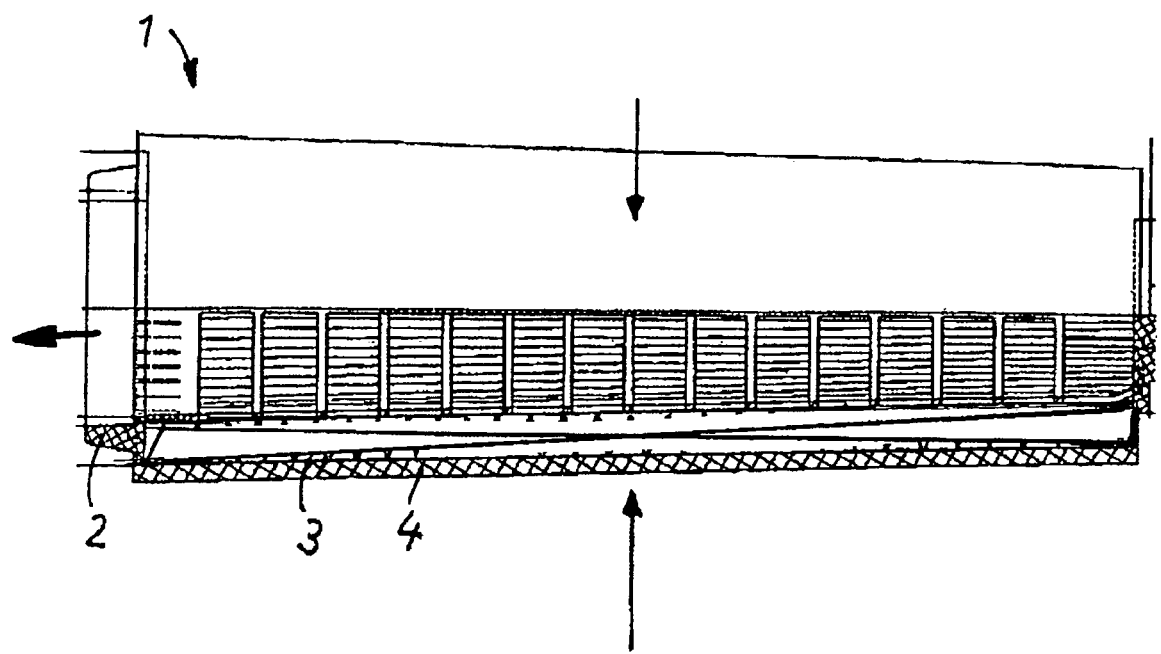

FILTER APPARATUS FOR FILTERING THE AIR FOR AN INTERNAL COMBUSTION ENGINE

BACKGROUND OF THE INVENTION

The present invention relates to a filter apparatus for filtering air in internal combustion engines comprising a flame-retardant filter insertable into a filter housing.

There are known filter devices arranged at the air inlet of the intake tract of an internal combustion engine for filtering the air supplied to the engine and for subjecting the combustion air drawn in to a filtering operation. These filter devices comprise a filter element in a filter housing, with the filter element being constructed, for example, as a pleated synthetic nonwoven or a paper medium through which the air that is to be cleaned flows. A filter device of this type is described in published European patent application no. EP 450,299.

In addition, it is known that the filter element in the air filter may be provided with a flame-retardant filter medium whose flame-retardant effect is achieved by using special impregnations. Such flame-retardant components are produced based on phosphorus-, antimony- or bromine-containing compounds, for example, and should prevent inadvertent ignition of the filter element, which itself is highly flammable. However, one disadvantage here is that the flame-retardant impregnation may decrease the dust storage capacity of the filter element, so the surface area of the oncoming flow surface of the filter element must be increased to achieve the required filtration capacity.

Another disadvantage is that the water stability of the filter element is reduced by using the flame-retardant impregnation. However, a high water stability is necessary because if water enters the intake tract of the engine, it is necessary to ensure that the filter element will continue to fulfill its function.

SUMMARY OF THE INVENTION

Accordingly, it was an object of the present invention to provide an improved filter apparatus for filtering the air for an internal combustion engine.

Another object of the invention is to provide a filter apparatus for filtering the air for an internal combustion engine which achieves flame retardancy by utilizing simple design measures.

A further object of the invention is to provide a filter apparatus for filtering the air for an internal combustion engine which is characterized by a good dust storage capacity, a high water stability and a good flame retardancy.

These and other objects have been achieved in accordance with the present invention by providing a filter apparatus for filtering air for an internal combustion engine, comprising a flame-retardant filter insertable into a filter housing, wherein said filter comprises a main filter element and a fleece prefilter arranged upstream of the main filter element in the direction of air flow, and wherein flame-retardant effect is achieved by the fleece prefilter.

Advantageous further preferred embodiments of the invention are described hereinafter.

In the filter device according to the invention, the filter that can be inserted into the filter housing is comprised of a main filter element and a fleece prefilter connected upstream from the main filter element in the direction of air flow. The flame-retardant effect is achieved through the fleece prefilter. This embodiment has the advantage that the flame-retardant or optionally also flame-protective properties of the main filter element are shifted to the fleece prefilter, so that the main filter element can be optimized with regard to its filtration properties. Thus according to one advantageous embodiment, the flame-retardant effect may be achieved exclusively by the fleece prefilte,r so that the main filter element remains free of the flame-retardant impregnation. If necessary, however, it may be expedient to also provide the main filter element with a flame-retardant finish in addition to providing such a finish for the fleece prefilter.

In addition, a high water stability of the main filter element is ensured. Since the flame-retardant finish on the main filter element is omitted and/or a smaller impregnation layer is achieved in the case of paper filters, the water stability of the main filter element is reduced not at all or only slightly. In the case of water input into the incoming air line of the engine, this therefore ensures that the main filter element will continue to fulfill its function.

Finally, a high dust storage capacity is also ensured. First, the fleece prefilter already has an additional dust storage capacity which is added to that of the main filter element. Secondly, the full dust storage capacity of the main filter element is preserved because it has been provided with little or no flame-retardant effect.

In one advantageous embodiment, the fleece prefilter comprises a synthetic fiber material, in particular a polymer material such as polyester, polyamide [nylon] or polypropylene. Nonflammable fibers distributed homogeneously in the fleece are introduced into this synthetic fiber material, whereby the amount of these nonflammable fibers relative to the total weight of the fiber material of the fleece prefilter preferably amounts to between 5% and 100%, and in particular between 25% and 50%, by wieght. Such a nonflammable fiber might be, for example, an oxidized polyacrylonitrile fiber (Panox) which does not burn or melt even at high temperatures up to approximately 700° C. These nonflammable fibers remain on the main filter element even if the other fibers of the fleece prefilter are burned or fused. The nonflammable fibers here have an adequate inherent stiffness so that the contact of an ignition body such as the tip of a cigarette with the main filter element is prevented.

The main filter element, which advantageously is made of synthetic fibers or cellulose and/or comprises cellulose fibers, is advantageously constructed in the form of a pleated (i.e., folded) filter, i.e., folded bellows. The fleece prefilter may be affixed to the folded tips of the pleated filter, yielding a composite of the two filter elements that is easy to install and replace.

In other embodiments, the fleece prefilter may also be laid loosely around the main filter element and may have no attachment points to the main filter element. To permit easy replacement of the element, the fleece prefilter may be secured to the main filter element via a sealing element.

Using the filter apparatus of the present invention, the service life of the filter may be increased. When using a folded paper filter for the main filter element, a flame-retardant effect can also be achieved without any impairment of filter capacity by constructing the fleece prefilter to be flame retardant. In this way, the manufacturing cost of the main filter element is also reduced because it need only be impregnated to make it moisture repellent but it need not necessarily also be flame retardant.

Additional advantages and advantageous embodiments will be described hereinafter.

BRIEF DESCRIPTION OF THE DRAWING

The invention will be described in further detail hereinafter with reference to an illustrative preferred embodiment shown in the accompanying drawing figure, which is a sectional view of a filter apparatus embodiment according to the present invention for filtering air for an internal combustion engine.

DETAILED DESCRIPTION OF PREFERRED EMBODIMENTS

The filter device 1 shown in a partially sectional view in the figure is used for filtering air for an internal combustion engine and designed to be situated in the air intake of the intake tract. The combustion air drawn in is sent in the direction of the arrow through the filter device 1, where it is cleaned to remove particles of dirt. The filter apparatus 1 is a combined filter which comprises a main filter element 3 and a fleece prefilter 4 which precedes the main filter in the flow path of the air. The main filter element 3 and the fleece prefilter 4 are connected with a seal on their end face and undetachably connected to a seal 2 which seals the filter device 1 with respect to a filter housing (not shown). The main filter element 3 is constructed as a pleated or folded filter, e.g. in the form of an annular filter bellows, and is advantageously made of filter paper and/or cellulose. The fleece prefilter 4 is arranged on the unfiltered air side of the main filter element 3 and is constructed as a filter mat and advantageously may be made of a synthetic fiber material.

A polymer material may be selected as the synthetic fiber material for the fleece prefilter, for example, polyester (PES), polyethylene (PE), polypropylene (PP), polycarbonate (PC), polyamide (PA), acrylonitrile-butadiene-styrene copolymer (ABS) or polystyrene (PS).

Infusible nonflammable fibers may be introduced into the synthetic fiber material of the fleece prefilter 4, preferably constituting between 5% and 100% of the total amount by weight of the fiber material, in particular 25% to 50% by weight. The weight of the fiber material per unit of area advantageously may lie between 50 g/m$^2$ and 100 g/m$^2$, and preferably between 100 g/m$^2$ and 200 g/m$^2$. In addition to the infusible and nonflammable properties, the fiber material of the fleece prefilter also has water repellent or at least water-draining properties. In addition, the fleece prefilter 4 also has filter properties so that the overall filtration capacity such as the dirt capacity and the degree of separation of the filter unit 1 are increased. Furthermore, the fleece prefilter serves the function of mechanical protection of the main filter element 3. In addition, the fleece prefilter serves to provide more uniform oncoming flow to the filter bellows.

The main filter element 3 and the fleece prefilter 4 may be attached together, in particular in such a manner that the folded tips of the folded main filter element 3 are connected to the facing side of the fleece prefilter 4. An attachment of this kind may be accomplished by thermal means, for example, in such a way that the plastic material of the fleece prefilter is softened by heating and the tips of the folds are pressed into the softened side.

Alternatively, the fleece prefilter may be attached with the aid of a suitable adhesive substance, in particular with a reactive adhesive or a hot-melt adhesive or the like.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter apparatus for filtering air for an internal combustion engine, said apparatus comprising a flame-retardant filter insertable into a filter housing, wherein said filter comprises a main filter element and a fleece prefilter arranged upstream of the main filter element in the direction of air flow, and wherein the flame-retardant effect is achieved solely by the fleece prefilter, and wherein the fleece prefilter is secured to the main filter element via a sealing element which seals the filter apparatus to the housing.

2. A filter apparatus according to claim 1, wherein the fleece prefilter is rendered flame-retardant by impregnation with a flame-retardant agent.

3. A filter apparatus according to claim 2, wherein the flame-retardant impregnation is applied solely to the fleece prefilter.

4. A filter apparatus according to claim 1, wherein the fleece prefilter is comprised of a synthetic fiber material.

5. A filter apparatus according to claim 4, wherein said synthetic fiber material is comprised of a polymer material selected from the group consisting of oxidized polyacrylonitrile, polyester, polyethylene, polypropylene, polycarbonate, polyamide, acrylonitrile-butadiene-styrene copolymer, and polystyrene.

6. A filter apparatus according to claim 1, wherein said fleece prefilter has a weight per unit area of between 50 g/m.sup.2 and 500 g/m.sup.2.

7. A filter apparatus according to claim 6, wherein said fleece prefilter has a weight per unit area of between 100 g/m.sup.2 and 200 g/m.sup.2.

8. A filter apparatus according to claim 1, wherein fleece prefilter is comprised fibers which are infusible and non-flammable.

9. A filter apparatus according to claim 8, wherein the fleece prefilter comprises between 5% and 100% by weight of said fibers which are infusible and non-flammable.

10. A filter apparatus according to claim 9, wherein the fleece prefilter comprises between 25% and 50% by weight of said fibers which are infusible and non-flammable.

11. The filter apparatus according to claim 8, wherein said non-flammable fibers include oxidized polyacrylonitirile fibers.

12. A filter apparatus according to claim 1, wherein the fleece prefilter is secured to the main filter element.

13. A filter apparatus according to claim 12, wherein the fleece prefilter is adhesively bonded to the main filter element.

14. A filter apparatus according to claim 1, wherein the main filter element is constructed as a pleated paper filter.

15. A filter apparatus according to claim 14, wherein the mail filter element is constructed as a as folded filter bellows.

* * * * *

UNITED STATES PATENT AND TRADEMARK OFFICE
CERTIFICATE OF CORRECTION

PATENT NO. : 7,632,328 B2 Page 1 of 1
APPLICATION NO. : 11/638529
DATED : December 15, 2009
INVENTOR(S) : Walz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this

Second Day of November, 2010

David J. Kappos
*Director of the United States Patent and Trademark Office*